United States Patent
Kikuchi

(10) Patent No.: US 8,915,325 B2
(45) Date of Patent: Dec. 23, 2014

(54) DRIVE DEVICE FOR ELECTRIC VEHICLE

(75) Inventor: Hiroyuki Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/823,521

(22) PCT Filed: Nov. 15, 2011

(86) PCT No.: PCT/JP2011/076300
§ 371 (c)(1),
(2), (4) Date: Mar. 14, 2013

(87) PCT Pub. No.: WO2012/067110
PCT Pub. Date: May 24, 2012

(65) Prior Publication Data
US 2013/0168173 A1 Jul. 4, 2013

(30) Foreign Application Priority Data
Nov. 18, 2010 (JP) ................................. 2010-258250

(51) Int. Cl.
| | | |
|---|---|---|
| *B60K 17/30* | (2006.01) | |
| *B62K 11/02* | (2006.01) | |
| *B62K 11/10* | (2006.01) | |
| *B62M 7/12* | (2006.01) | |
| *B62K 25/20* | (2006.01) | |
| *B62J 6/18* | (2006.01) | |

(52) U.S. Cl.
CPC ................ *B62K 11/02* (2013.01); *B62K 11/10* (2013.01); *B62M 7/12* (2013.01); *B62K 25/20* (2013.01); *B62J 6/18* (2013.01); *B62K 2202/00* (2013.01); *B62K 2204/00* (2013.01); *B62K 2208/00* (2013.01)
USPC .......................................... 180/220; 180/219

(58) Field of Classification Search
CPC ...... B62K 2204/00; B62K 11/10; B62M 7/12
USPC .................................................. 180/220, 219
See application file for complete search history.

(56) References Cited

U.S. PATENT DOCUMENTS

| | | | |
|---|---|---|---|
| 6,318,743 B1 | 11/2001 | Nakashima et al. | |
| 7,198,129 B2 * | 4/2007 | Sakaki et al. ................. | 180/219 |

(Continued)

FOREIGN PATENT DOCUMENTS

| | | |
|---|---|---|
| EP | 1 389 579 B1 | 4/2009 |
| JP | H04-292284 A | 10/1992 |

(Continued)

OTHER PUBLICATIONS

Extended European Search Report issued in corresponding EP Patent Application 11841835.9 and dated Mar. 3, 2014.

(Continued)

*Primary Examiner* — Kevin Hurley
*Assistant Examiner* — Michael Stabley
(74) *Attorney, Agent, or Firm* — Carrier Blackman & Associates, P.C.; William D. Blackman; Joseph P. Carrier

(57) ABSTRACT

A swing arm (25) including a pivot portion (57) pivotally supported by a vehicle body frame (2) and an arm portion (100) extending from the pivot portion (57) towards a back side of a vehicle body. The arm portion (100) includes a box-shaped case (58) being integrally formed with the pivot portion (57) and having one side in a width direction of the vehicle body opened, and a case cover (59). A harness (64) pulled out from the motor (60) is fixedly supported on the case (58) side at a first position proximate to the motor (60), and extended to a control device (52) at a front side of the vehicle body from the arm portion (100) through a grommet (66, 67) arranged at a front wall (597) of the case cover (59) at a second position on the pivot portion (57) side.

9 Claims, 11 Drawing Sheets

(56) References Cited

U.S. PATENT DOCUMENTS

| | | | |
|---|---|---|---|
| 7,506,708 B2 * | 3/2009 | Iwashita | 180/65.1 |
| 8,360,188 B2 * | 1/2013 | Yonehana et al. | 180/220 |
| 8,371,411 B2 * | 2/2013 | Kawaguchi et al. | 180/220 |
| 8,505,668 B2 * | 8/2013 | Iwakami et al. | 180/220 |
| 2004/0079574 A1 * | 4/2004 | Ono et al. | 180/252 |
| 2006/0038667 A1 | 2/2006 | Kitayama | |
| 2010/0078237 A1 * | 4/2010 | Yonehana et al. | 180/65.51 |
| 2012/0000720 A1 * | 1/2012 | Honda et al. | 180/65.1 |
| 2012/0000724 A1 * | 1/2012 | Mimura et al. | 180/291 |
| 2012/0067659 A1 * | 3/2012 | Ogura | 180/291 |
| 2012/0080254 A1 * | 4/2012 | Tsukamoto et al. | 180/68.5 |
| 2012/0176086 A1 * | 7/2012 | Nakamura et al. | 320/109 |
| 2012/0248851 A1 * | 10/2012 | Nakashima | 301/6.5 |

FOREIGN PATENT DOCUMENTS

| | | |
|---|---|---|
| JP | 2004-009852 A | 1/2004 |
| JP | 4188641 B2 | 11/2008 |
| JP | 2010-247811 A | 11/2010 |
| TW | M315667 U | 7/2007 |
| TW | 1296976 B | 5/2008 |

OTHER PUBLICATIONS

Taiwanese Office Action issued Jun. 10, 2014 in the corresponding TW Patent Application 100141438 with a partial English translation thereof.

* cited by examiner

DRIVE DEVICE FOR ELECTRIC VEHICLE

TECHNICAL FIELD

The present invention relates to drive devices of an electric vehicle, and in particular, relates to a drive device of an electric vehicle including an electric motor, which is a drive source of the electric vehicle disposed in a swing arm, and a harness connected to the electric motor and pulled out to the exterior of the swing arm.

BACKGROUND ART

A drive device of an electric vehicle in which an electric motor, which is a drive source of the electric vehicle, and a portion of the harness extended from the motor to a power supply, that is, a battery are accommodated in a swing arm supported by a vehicle body frame to freely swing in the up and down direction is known. Japanese Patent No. 4188641 discloses an electric vehicle in which the front portion of a rear arm (i.e., swing arm) is swingably supported by the vehicle body frame, the motor and a power unit or an electrical component are incorporated in the back portion of the rear arm, and a harness for connecting the power unit and an external battery is held by the rear arm. The rear arm described in Japanese Patent No. 4188641 includes a first member for accommodating the power unit and the harness and extending in a front and back direction of a vehicle body, a second member coupled to the side at the back part of the first member and interiorly including a motor, a third member coupled to the side at the front part of the first member and configuring a pivotally supporting portion (pivot portion) of the rear frame in the vehicle body frame with the first member, and a cover, positioned between the second member and the third member, for covering the first member. The harness is pulled out to the outside through a through-hole formed at the joint portion of the first member and the third member.

CITATION LIST

Patent Documents

Patent Document 1 Japanese Patent Publication No. 4188641

SUMMARY OF INVENTION

Technical Problem

The conventional swing arm described in the Patent Document 1 includes a through-hole at the joint portion of the first member and the third member, and thus the strength of the pivot portion configured by the first member and the second member is assumed to lower. The pivot portion requires a large strength to be able to support the swing arm, and needs measures such as increasing the thickness of the first member and the second member to enhance the strength that is assumed to lower by the through-hole, and hence the weight of the swing arm tends to increase.

In light of the problems of the prior art, it is an object of the present invention to provide a drive device of an electric vehicle suitable for simplifying the shape of the swing arm to reduce the number of processing steps and reduce the weight of the swing arm.

Solution to Problem

The present invention related to a drive device of an electric vehicle to accomplish aforementioned object has a first feature that includes a pivot portion pivotally supported by a pivot shaft arranged in a vehicle body frame of an electric vehicle, and an arm portion extending from the pivot portion towards a back side of a vehicle body to support a rear wheel (RW) at an end on the back side of the vehicle body and accommodating an electric motor for driving the rear wheel (RW), wherein the arm portion includes a box-shaped case being integrally formed with the pivot portion and having one side in a width direction of the vehicle body opened, and a case cover for covering the open side of the case, and a harness, connected to the electric motor, supported on the case side at a first position proximate to the electric motor, and pulled out towards a front side of the vehicle body from the arm portion through a harness supporting portion arranged at a front wall of the case cover at a second position on the pivot portion side is arranged.

The second feature is that the harness is fixedly supported on the case side using a clamp at the first position, and is supported by the case cover through an elastic member at the harness supporting portion of the second position.

The third feature is that the case cover includes an extended cover portion having a guiding wall for guiding a portion of the harness pulled out from the arm portion to a line along with the width direction of the vehicle body on the front side of the vehicle body.

The fourth feature is that the elastic member is a grommet which outer periphery engages a groove formed in the front wall of the case cover, the harness being passed through the grommet and supported by the case cover.

The fifth feature is that the electric vehicle includes a battery box arranged on a front side of the pivot portion and a control device positioned at an upper part of the battery box, and the harness guided by the extended cover portion is passed between the battery box and the pivot portion and wired to the control device.

The sixth feature is that the harness is passed between the battery box and the pivot portion to extend from one end to the other end in a vehicle width direction of the pivot portion, and wired to the control device.

The seventh feature is that the drive device of the electric vehicle comprises, a rear fender being extended to between the battery box and the pivot portion, and including an opening formed at a position facing the pivot portion; and the harness is wired from the swing arm side to the battery box side through the opening.

The eighth feature is that the harness includes three-phase power lines of the electric motor and a sub-harness including a plurality of signal lines, the three-phase power lines (62U, 62V, 62W) being pulled out from the arm portion having an outer periphery covered by a corrugate tube at a portion extending from the arm portion to the control device.

The ninth feature is that the harness is passed through an annular portion arranged in a stay attached to the arm portion at a portion wired to the extended cover portion.

Advantageous Effects of Invention

In accordance with the present invention having a first feature, the harness connected to the electric motor is supported by the case at the first position in the vicinity of the electric motor, and is supported on the case cover side at the second position where it is pulled out from the arm portion to the front side of the vehicle body, and thus the processing for supporting the harness is not required on the portion closer to the pivot portion on the case side as well as the pivot portion itself. Therefore, the processing steps of the case can be reduced and the reinforcement or the like of the pivot portion is unnecessary, so that the weight of the swing arm can be prevented from increasing.

In accordance with the present invention having second and fourth features, the harness can be reliably fixed to the case at the first position in the vicinity of the electric motor, and the harness is supported through the elastic member at the second position closer to the pivot portion, and thus the harness can be supported by the swing arm while absorbing the stress applied on the harness by the movement of the swing arm.

In accordance with the present invention having a third feature, the harness can be guided in a predetermined direction by the extended cover portion and the harness can be protected from water, spattered pebbles, and the like by the guiding wall.

In accordance with the present invention having a fifth feature, the harness can be guided to a predetermined position while being protected by wiring the harness to between the pivot portion and the battery box.

In accordance with the present invention having a sixth feature, the harness is wired along the width of the pivot portion, that is, the length direction of the pivot shaft, so that the swing arm deflects in the direction the harness is twisted when swung with the pivot shaft as the center, and thus the amount of deformation of the harness can be reduced and the durability can be enhanced compared to the layout in which the harness is bent at a large angle with respect to the length direction.

In accordance with the present invention having a seventh feature, the harness is wired on the side opposite to the side the rear wheel is positioned with respect to the harness, and thus is protected from water and spattered pebbles. In accordance with the present invention having an eighth feature, the three-phase power lines can be more reliably protected from disturbance.

In accordance with the present invention having a ninth feature, the harness pulled out from the arm position can be compactly gathered by being passed through the annular portion, and thus the workability of tasks passing through the opening of the rear fender and the corrugate tube can be enhanced.

DESCRIPTION OF EMBODIMENTS

Figure 2:
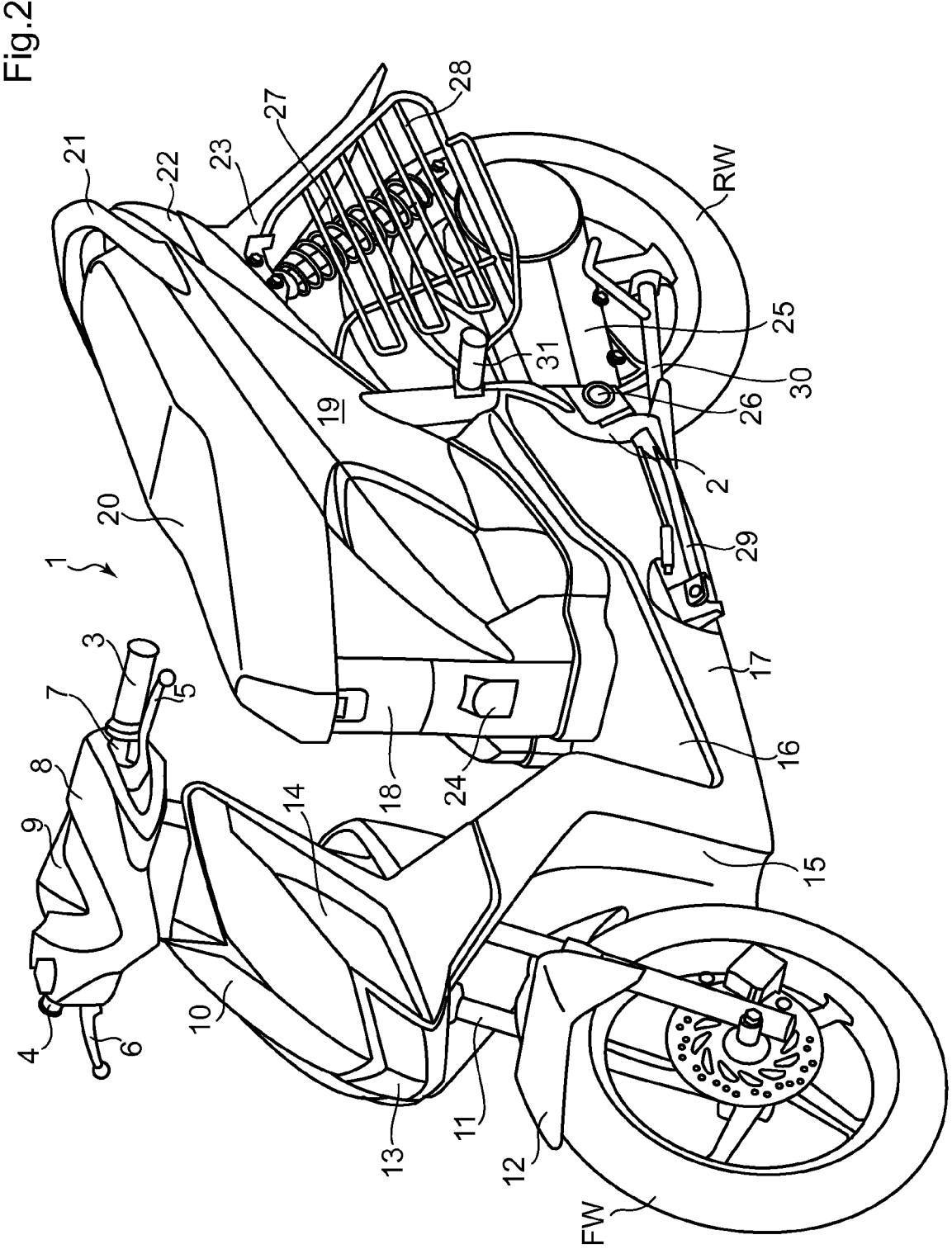
FIG. 2 is a perspective view from a left front side of the electric vehicle including a drive device according to an embodiment of the present invention.

Hereinafter, an embodiment of the present invention will be described with reference to the drawings. FIG. 2 is a perspective view from a left front side of an electric vehicle including a drive device according to an embodiment of the present invention. An electric vehicle 1 is a two-seated scooter type two-wheeled vehicle having a low floor. The electric vehicle 1 includes a vehicle body frame 2, to be described in detail afterwards, where each part of the vehicle is supported by the vehicle body frame 2. Mostly of a steering handle 7, excluding left and right grips 3, 4 and brake levers 5, 6, is covered with a handle cover 8. The handle cover 8 incorporates a meter (not shown), and a meter visor 9 is arranged on the front side of the meter.

The steering handle 7 is coupled to a front fork 11 by way of a steering shaft (to be described later) supported by a head pipe (to be described later) covered with a front cover 10. The front fork 11 pivotally supports a front wheel FW in a freely rotating manner at the lower end. The front fork 11 includes a front fender 12 arranged to cover the front wheel FW from the upper part. A head light 13 and a front winker 14 are incorporated in the front cover 10. A leg shield 15 positioned on the back side of the vehicle body with respect to the front fork 11 is connected to the lower side of the front cover 10.

A central part of the vehicle body is covered by a substantially horizontally arranged floor panel, an under cover 17 positioned on the lower side thereof, and a center cover 18 and a frame body cover 19 connected to the upper part of the under cover 17.

A tandem sheet 20 is arranged on the upper side of the center cover 18 and the frame body cover 19. A grip rail 21 is arranged on the back side of the tandem sheet 20, and a rear lamp unit 22 including a tail lamp and a rear winker is arranged on the lower side of the grip rail 21. The lower part of rear lamp unit 22 is connected to a rear fender 23. A lid 24 facing a charging coupler (to be described later) for charging the main battery (to be described later) positioned on the lower side of the tandem sheet 20 is arranged at the front part of the center cover 18.

The swing arm 25 is supported to freely swing in the up and down direction by a pivot shaft 26 in the vehicle frame 2. The back part of the swing arm 25 is supported by the back part of the vehicle body frame 2 by a rear suspension 27. The electric motor for driving the rear wheel RW and the harness pulled out from the electric motor are accommodated in the swing arm 25. The configuration of the swing arm 25 will be described later. A guard 28 for covering the rear wheel RW and the rear suspension 27 from one side of the vehicle body is arranged between the swing arm 25 and the rear fender 23.

A side stand 29 for supporting the vehicle body while parked is pivotally supported at the lower part on the left side of the vehicle body frame 2, and a main stand 30 is pivotally supported at the lower part of the center of the vehicle body frame 2. A passenger step 31 that projects out to the left and the right of the vehicle body from the vehicle body frame 2 is pivotally supported on the vehicle body frame in front of the guard 28.

Figure 3:
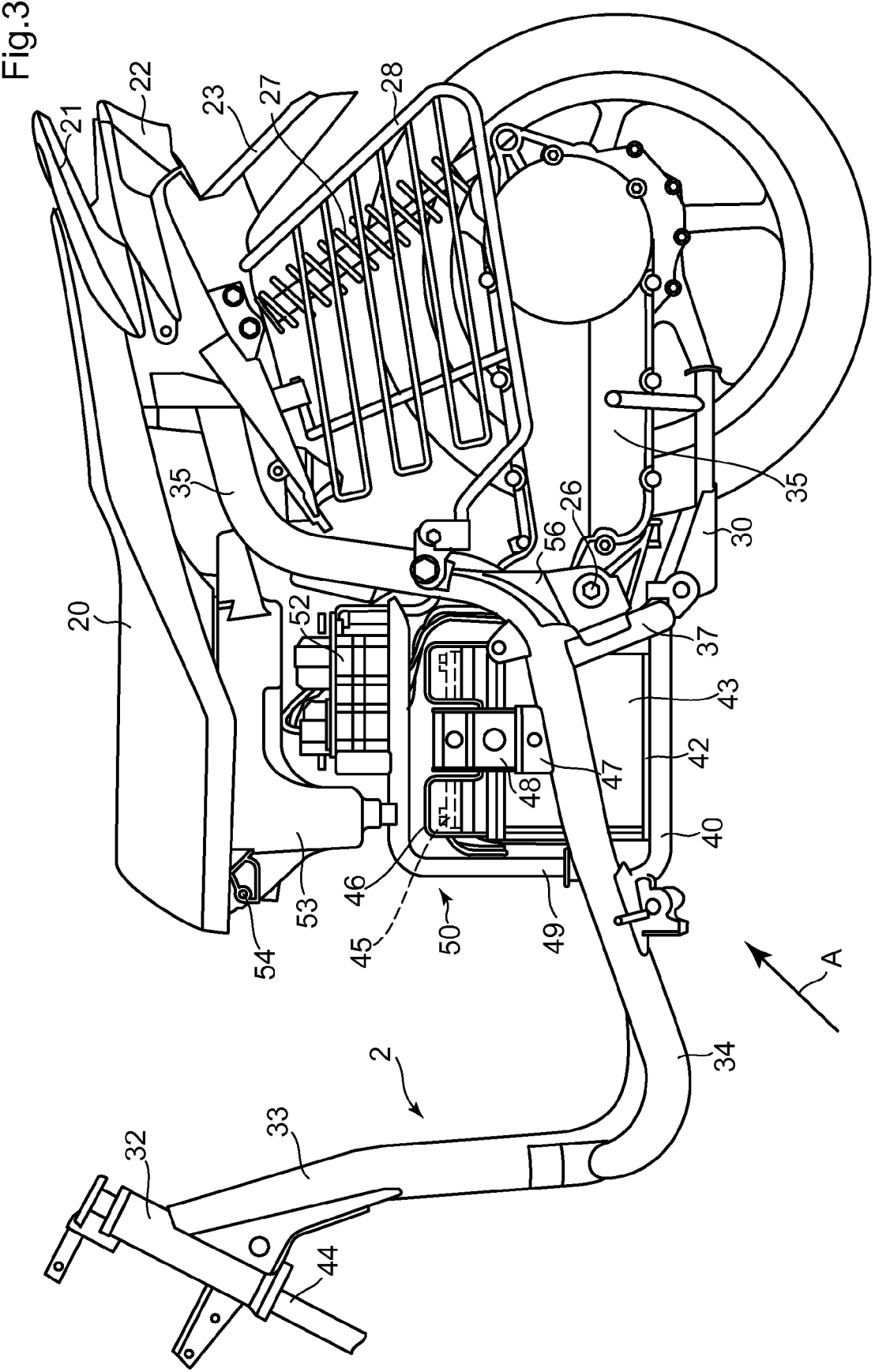
FIG. 3 is a left side view of the main part of the electric vehicle with the cover detached.
Figure 4:
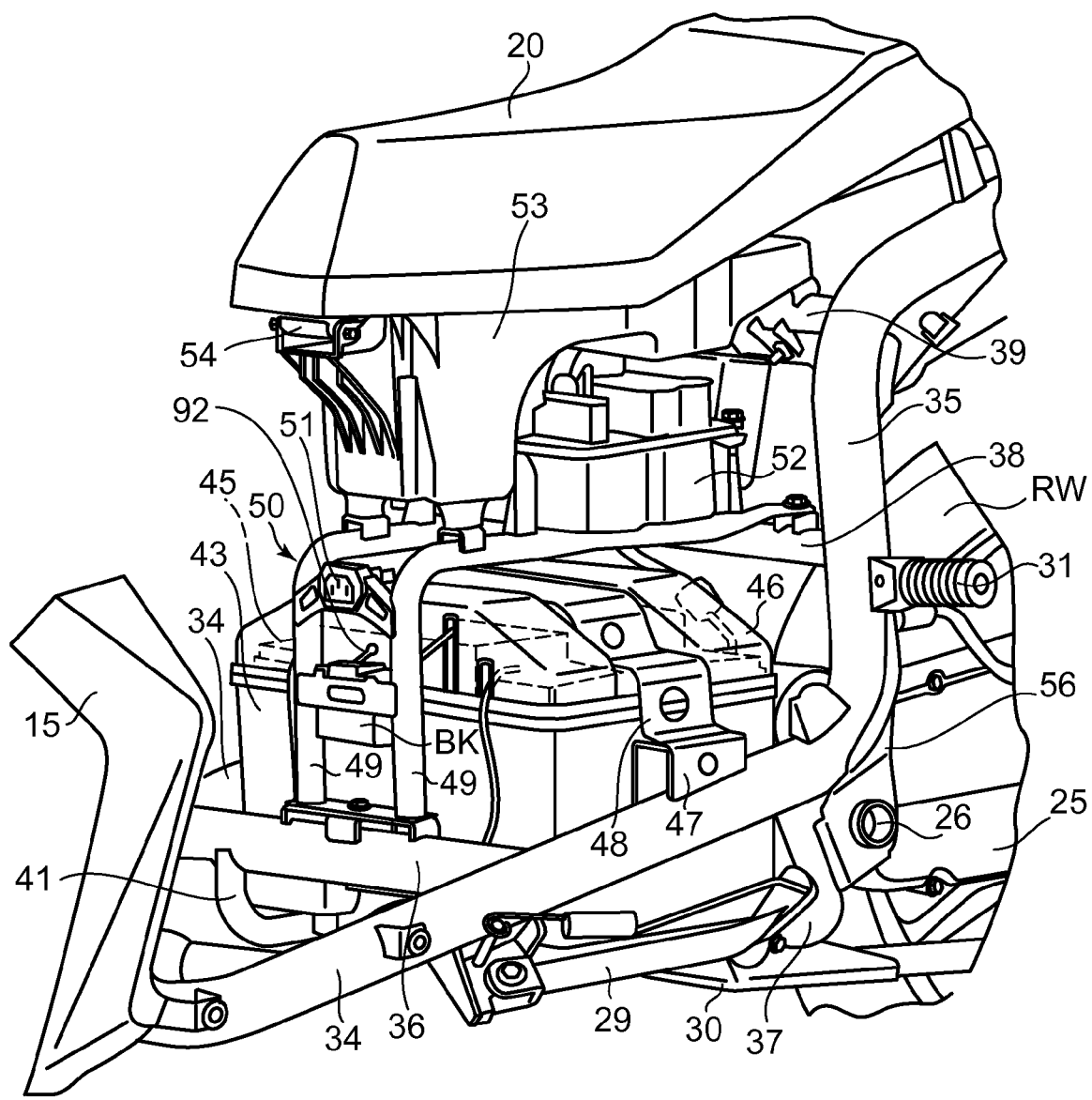
FIG. 4 is a perspective view of the main part of the electric vehicle with the cover detached.
Figure 5:
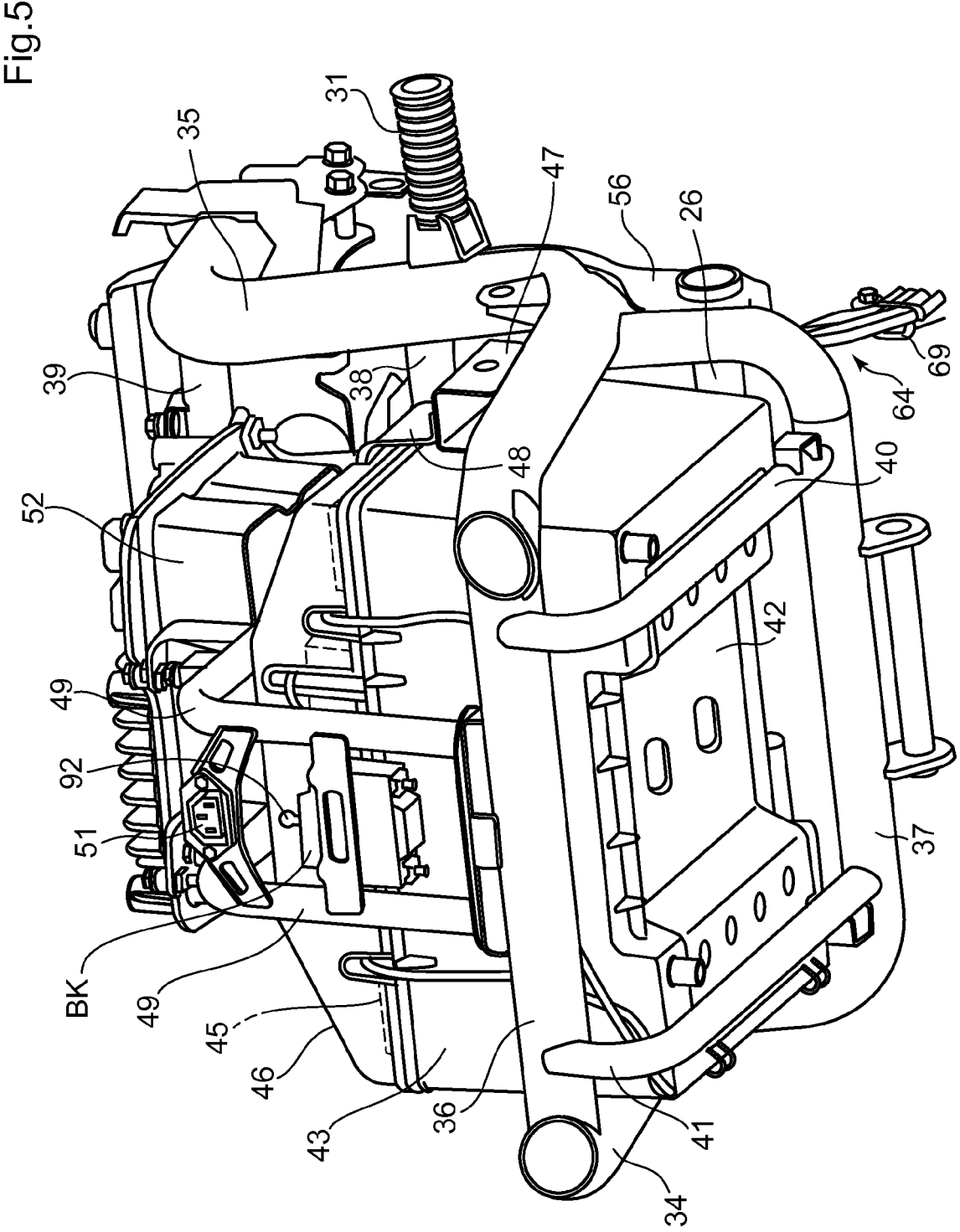
FIG. 5 is a perspective view of the main part seen from the direction of the arrow A in FIG. 3.

FIG. 3 is a left side view of the main part of the electric vehicle 1 with the cover detached. FIG. 4 is a perspective view of the main part of the electric vehicle 1 with the cover detached. FIG. 5 is a perspective view of the main part seen from the direction of the arrow A in FIG. 3. The vehicle body frame 2 includes a head pipe 32 at the front part of the vehicle body, a down frame 33 having the front end joined to the head pipe 32 and the back end extended to the lower side, a pair of under frames 34 coupled to the lower part of the down frame 33, respectively branched to the left and the right in the width direction of the vehicle body, and extended towards the back side of the vehicle body, and a rear frame 35 extended to the upper back side of the vehicle body from the under frame 34.

The left and right under frames 34, 34 are coupled to each other by cross pipes 36, 37, and the left and right rear frames 35, 35 are coupled to each other by cross pipes 38, 39. The cross pipe 36 arranged closer to the front side of the vehicle body is a straight pipe for coupling the under frames 34, 34 substantially linearly, and the cross pipe 37 arranged closer to the rear frame 35 than the cross pipe 36 is a bent pipe having a first portion extending to the lower side from the under frame 34, 34 and a second portion extending horizontally from the first portion.

The second portion (horizontal portion) of the cross pipe 37 and the cross pipe 36 on the front side are coupled with two sub-pipes 40, 41 extending in the front and back direction of the vehicle body, where the sub-pipes 40, 41 and a plate 42 having the left and right ends joined to the sub-pipes 40, 41 form a mounting section structure of a battery box 43. The side stand 29 is attached to the under frame 34 on the left side of the vehicle body, and the main stand 30 is attached to the second portion of the cross-pipe 37.

The head pipe 32 supports a steering shaft 44 in a freely turning manner. The steering handle 7 is coupled to the upper part of the steering shaft 44, and the front fork 11 is coupled to the lower part. See FIG. 2 for the steering handle 7 and the front fork 11.

The battery box 43 accommodates a plurality of (e.g., four) batteries (main batteries) 45 aligned in the width direction of the vehicle body, and has the upper part covered with a transparent lid 46. The battery box 43 has both ends held on the plate 42 using a band 48 coupled to a bracket 47 to be joined to the under frames 34, 34.

Furthermore, a mount 50 composed of two pipes 49, 49 having both ends coupled to the cross pipe 38 bridged between the rear frames 35, 35 and the cross pipe 36 closer to the front side bridged between the under frames 34, 34 is arranged across the upper side of the battery box 43. A charging coupler 51, to which an exterior charger can be connected, is arranged at the front part of the mount 50. A breaker BK positioned on the lower side of the charging coupler 51 is arranged between two pipes 49, 49 configuring the mount 50. The breaker BK is connected between the plurality of batteries 45 connected in series, and is used at the time of maintenance of the battery 45 and the control device 52 to shield the power by manually operating the knob 92.

The mount 50 mounts and supports the control device 52, and also cooperatively operates with the cross pipe 39 to support a storage box 53 extending in the front and back direction of the vehicle body across the control device 52. The storage box 53 provides a space that the user can use to store some of the objects the user carry.

The tandem sheet 20 doubles as a lid for covering the upper part of the accommodation box 53, and is supported in a freely opening/closing manner at the storage box 53 with a hinge 54 arranged at the front part thereof as a pivot shaft. The control device 52 includes a DC-DC converter, a battery management device (BMU), a power drive unit (PDU) for controlling the electric motor, and the like. A sub-battery, charged by the battery 45, for outputting a control voltage of the control device 52 and a voltage for biasing the lamp device such as the head light and the winker may also be provided.

A pair of left and right brackets (pivot plates) 56 coupled to an intermediate region of the under frame 34 and the rear frame 35, and the first portion of the cross pipe 37 is arranged, where both ends of the pivot shaft 26 are supported by the bracket 56.

Figure 1:
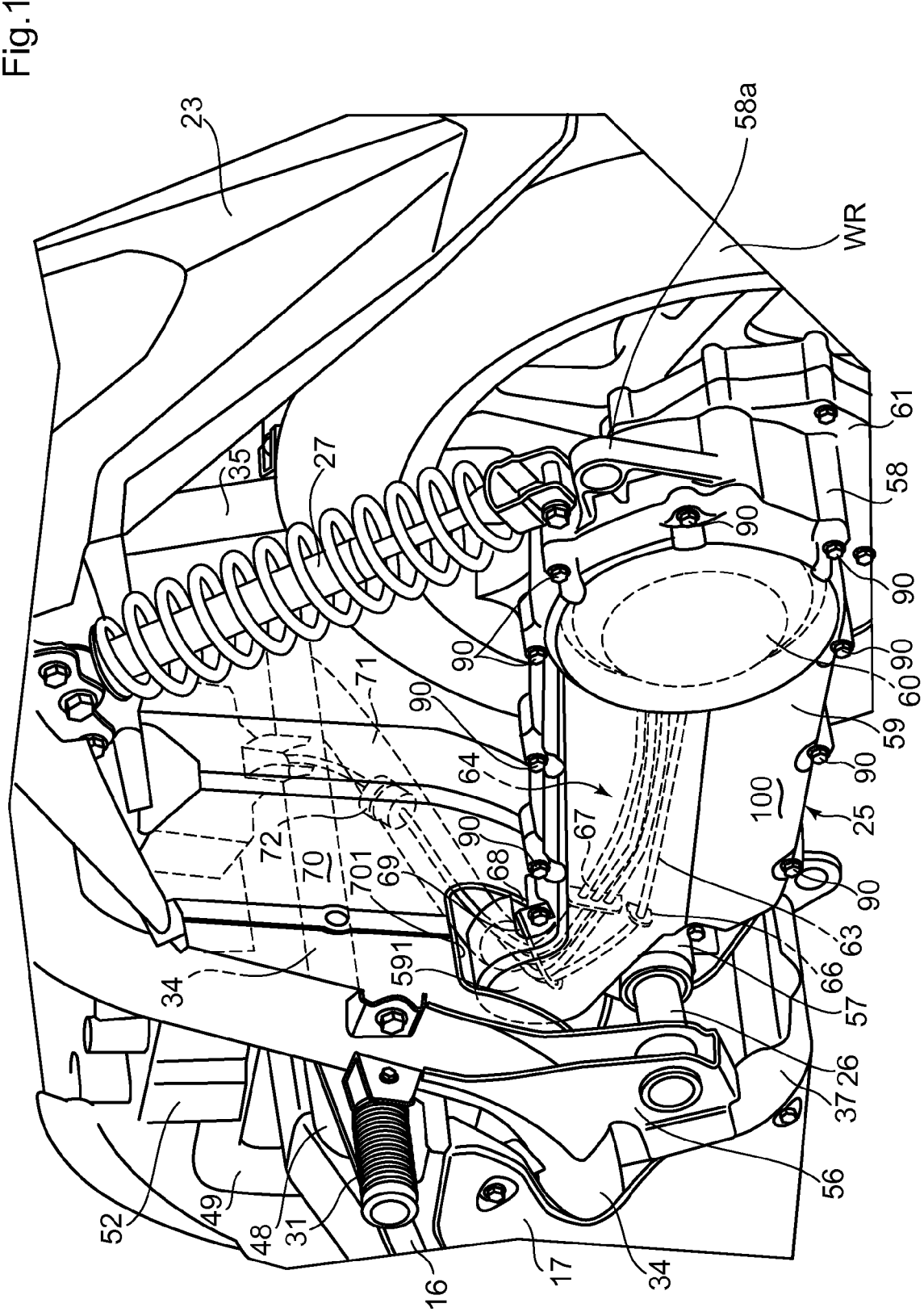
FIG. 1 is a perspective view of main parts of an electric vehicle according to an embodiment of the present invention.
Figure 6:
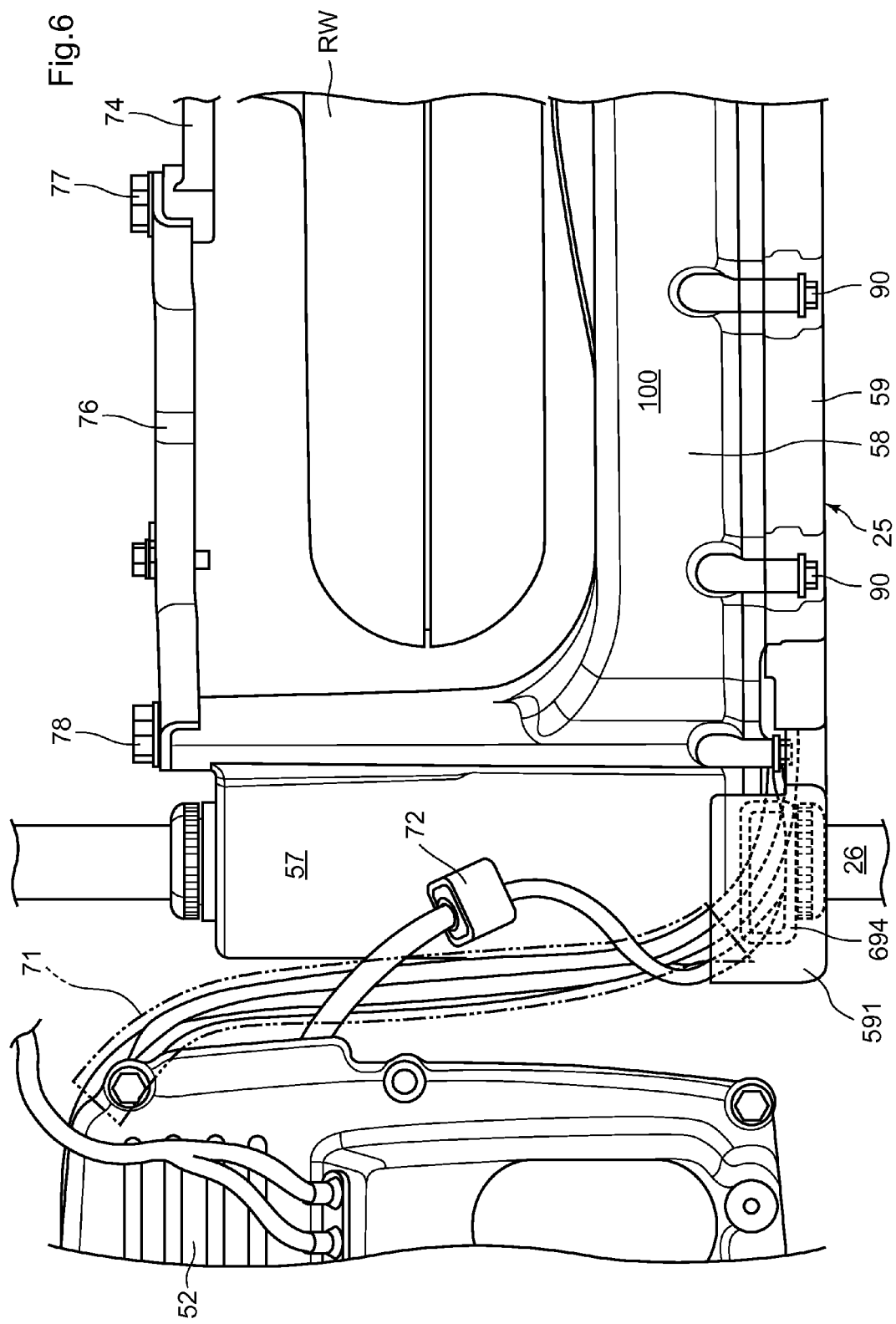
FIG. 6 is a plan view of the main parts of the electric vehicle including the swing arm.
Figure 7:
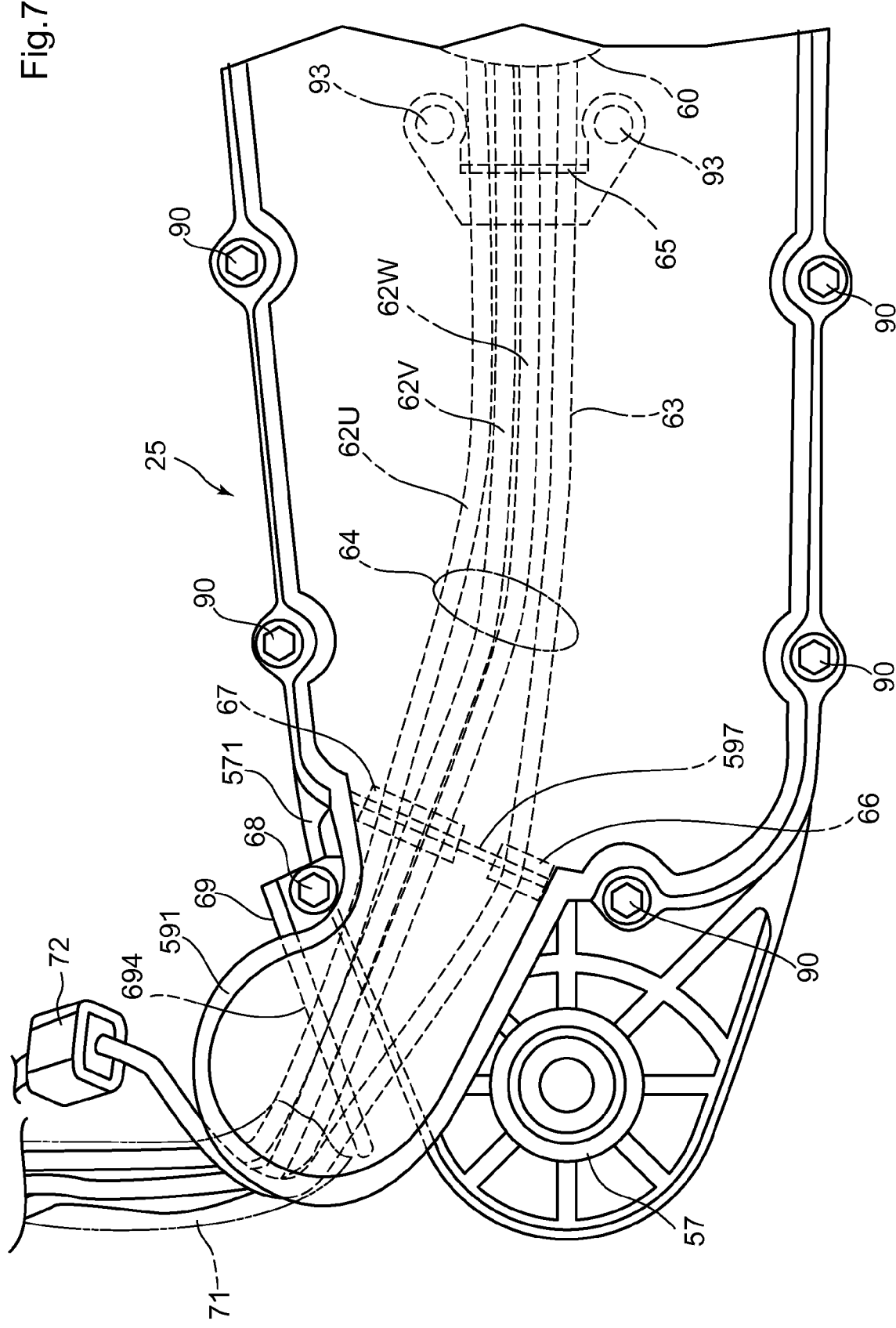
FIG. 7 is a left side view of the main parts of the electric vehicle including the swing arm.
Figure 8:
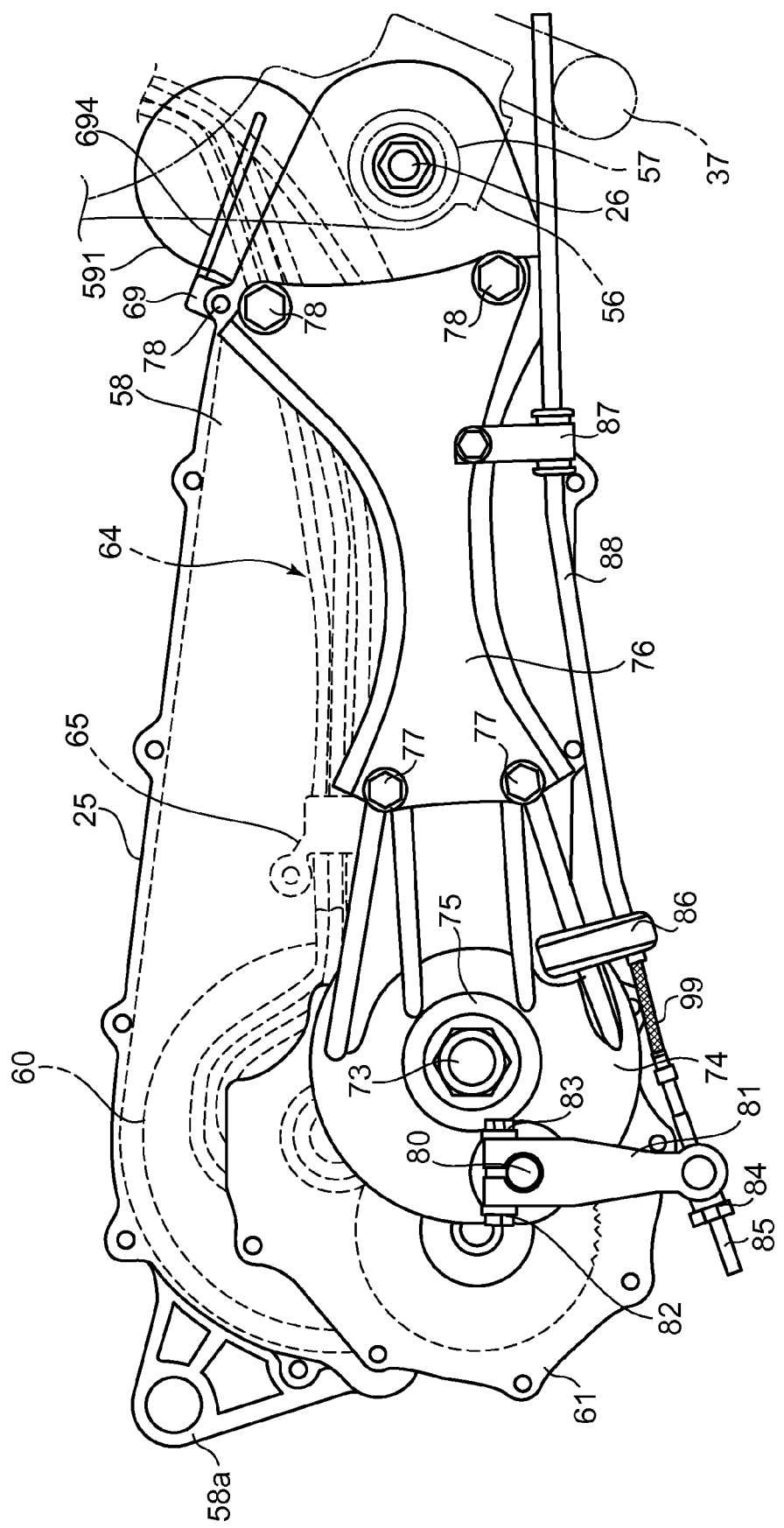
FIG. 8 is a right side view of the main parts of the electric vehicle including the swing arm.
Figure 9:
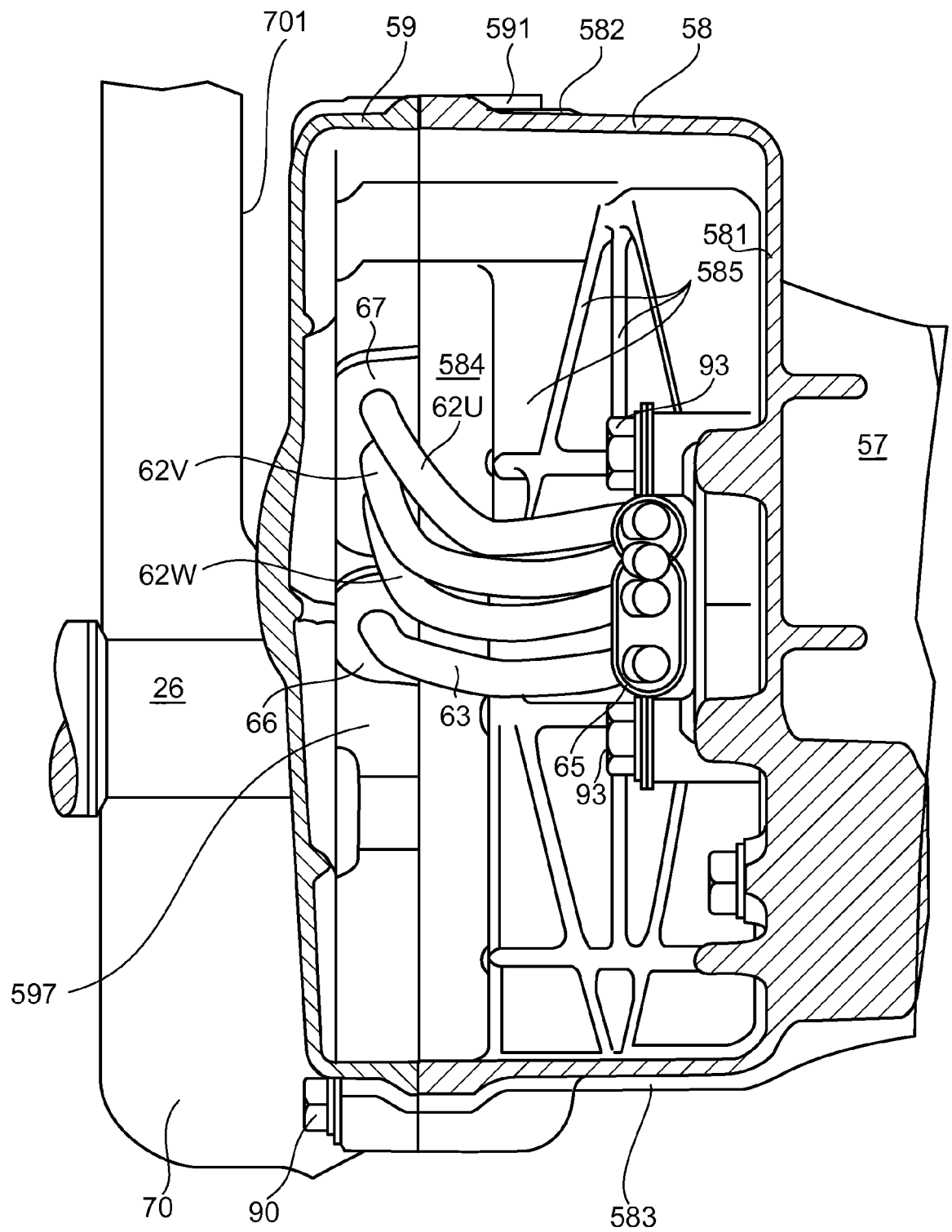
FIG. 9 is a backward view showing an interior of the swing arm shown in the FIG. 7.

FIG. 1 is a perspective view of the main parts of the electric vehicle including the swing arm. FIG. 6 is a plan view of the main parts of the electric vehicle including the swing arm. FIG. 7 is a left side view of the main parts of the electric vehicle including the swing arm. FIG. 8 is a right side view of the main parts of the electric vehicle including the swing arm. FIG. 9 is a backward view showing an interior of the swing arm 25 shown in the FIG. 7. In FIG. 1 and FIG. 6 to FIG. 9, the swing arm 25 includes a pivot portion 57 supported in a freely rotatable manner by the pivot shaft 26 having both ends coupled to the pivot plate 56, a case 58 extending to the back side of the vehicle from the position deviated in the left direction of the vehicle width with respect to the pivot portion 57, and a case cover 59 for covering the left side of the case 58. The case cover 59 is tightened to the case 58 using the plurality of bolts 90, and forms a swing arm portion 100 with the case 58.

In FIG. 1 and FIG. 3, the coupling portion of the lower end of the rear suspension 27 and the back part of the swing arm 25 is illustrated in a decoupled state to clarify the shape of a rear suspension supporting stay 58a.

The case 58 includes an electric motor (hereinafter simply referred to as "motor") 60 closer to the back side of the vehicle body, and also includes a reducer 61 for reducing the output revolution of the motor 60 and transmitting the same to the rear wheel RW.

As shown in FIG. 9, the case 58 includes a side wall 581 on the right side of the vehicle body, an upper wall 582 and a lower wall 583 respectively extending on the left side of the vehicle body at above and below the side wall 581, and a front and back wall (only front wall 584 is illustrated) connected to the side wall 581, and the upper wall 582 and the lower part wall 581 at front and back in the vehicle body direction, and has a box shape in which the left side of the vehicle body is opened. The open section of the box-shaped case portion 58 is covered with the case cover 59. The case 58 is formed with plural ribs 585 such that the height (dimension in vehicle width direction) gradually increases from the back side towards the front side of the vehicle body. The motor 60 has a stator having a three-phase winding fixed to the side wall 581 of the case 58 with a bolt (not shown).

The motor 60 is a three-phase AC (Alternating Current) brushless motor, where three power lines 62U, 62V, 62W respectively connected to the wiring of U-phase, V-phase, and W-phase, and a harness 64 including a sub-harness 63 with a plurality of signal lines connected to a sensor for detecting the position of a rotor are accommodated in a space surrounded by the case 58 and the case cover 59. The harness 64 is fixed and supported at the side wall 581 of the case 58 using a clamp 65 at a position (first position) proximate to the motor 60. The clamp 65 is fixed to the side wall 58 of the case 58 by bolts 93, 93, and individually supports each power line 62U, 62V, 62W and the sub-harness 63. It is desirable that the harness 64 is reliably fixed to the connecting portion with the motor 60 such that load is not applied at the position (first position) proximate to the motor 60.

As shown in FIG. 9, the harness 64 is guided by the ribs 585, which height becomes higher towards the front side of the vehicle body, so as to approach the case cover 59 on the front side of the vehicle body, and is fixed to the case cover 59 by grommets 66, 67 to be fitted to a grommet groove (hereinafter described) formed in the case cover 59 at the position of the front wall 584 of the case 58. The grommet 66 is for the sub-harness 63, and the grommet 67 is for the power lines 62U, 62V, 62W. The grommet 67 has a hole for passing each power line 62U, 62V, 62W. The grommets 66, 67 are both made from an elastic material such as rubber. The stress due to the deflection of the harness 64 caused by the swinging of the swing arm 25 can be easily absorbed while ensuring the adhesiveness of the harness 64 and the case cover 59 by using the grommets 66, 67 made from an elastic material.

A stay 69 is fixed by the bolt 68 at the end face of the upper wall 571 of the pivot portion 57. The harness 64 pulled out from the case 58 and the case cover 59 through the grommets 66, 67 is passed through an annular portion 694 of the stay 69 and directed towards the center in the width direction of the vehicle body by an extended cover portion 591 formed at the front most part of the case cover 59.

A second rear fender 70 positioned on the upper front side of the rear wheel RW is arranged separate from the rear fender 23 positioned on the upper back side of the rear wheel RW between the front part of the swing arm 25, that is, the pivot portion 57 and the battery box 43 and the control device 52. The upper part of the second rear fender 70 is coupled to the front part of the rear fender 23 and the lower part is fixed to the second portion of the cross pipe 37.

The second rear fender 70 includes an opening 701 at a position facing the pivot portion 57. The harness 64 directed by the extended cover portion 591 is passed through the opening 701 of the second rear fender 70, extended through the back side of the battery box 45 and the control device 52 from the end on the left side of the vehicle body to the end on the right side of the vehicle body, and connected to a three-phase connection terminal (not shown) at the right side of the vehicle body of the control device 52.

The power lines 62U, 62V, 62W of the harness 64 passed through the opening 701 are protected by a protective corrugate (protective tube) 71. The power lines 62U, 62V, 62W and the sub-harness 63 are connected to the control device 52. The protective tube 71 may be placed over the power lines 62U, 62V, 62W over the region from the stay 69 to the control device 52. The sub-harness 63 can couple the control device 52 and the middle of the stay 69 with a coupler 72, so that the control device 52 side and the stay 69 side are removably attachable. The power lines 62U, 62V, 62W and the sub-harness 63 can be fixed to a member closer to the control device 52 such as the cross pipe 38 with a clamp means (not shown) at between the stay 69 and the control device 52. In this case, the distance between the clamp means and the stay 69 is determined with a margin so as not to be subjected to influence with respect to the movement of the swing arm 25.

In FIG. 8, an output shaft 73 of the reducer 61 is held in a freely rotating manner by a bearing 75 accommodated in the rear bracket 74. A coupling plate 76 is arranged to couple the rear bracket 74 and the right end of the pivot portion 57. The coupling plate 76 is coupled to the rear bracket 74 using bolts 77, 77 and is coupled to the right end of the pivot portion 57 using bolts 78, 78. The rear bracket 74 holds a brake shoe of a drum type brake arranged in between the reducer 61 and a cam for opening and closing the brake shoe (both are not shown). An arm 81 is tightened to a cam shaft 80 projecting out in the right direction of the vehicle body from the cam (not shown) using a bolt 82 and a nut 83, and a brake bolt 85 is supported at the end of the arm 81 through an adjustment nut 84. The brake bolt 85 is coupled to a brake wire 99 passed through a brake tube 88 held by the swing arm 25 and the vehicle body frame 2 at a plurality of areas by the clamps 86, 87, and the like. The other end of the brake wire 99 is coupled to a brake handle 5 of the steering handle 7.

Figure 10:
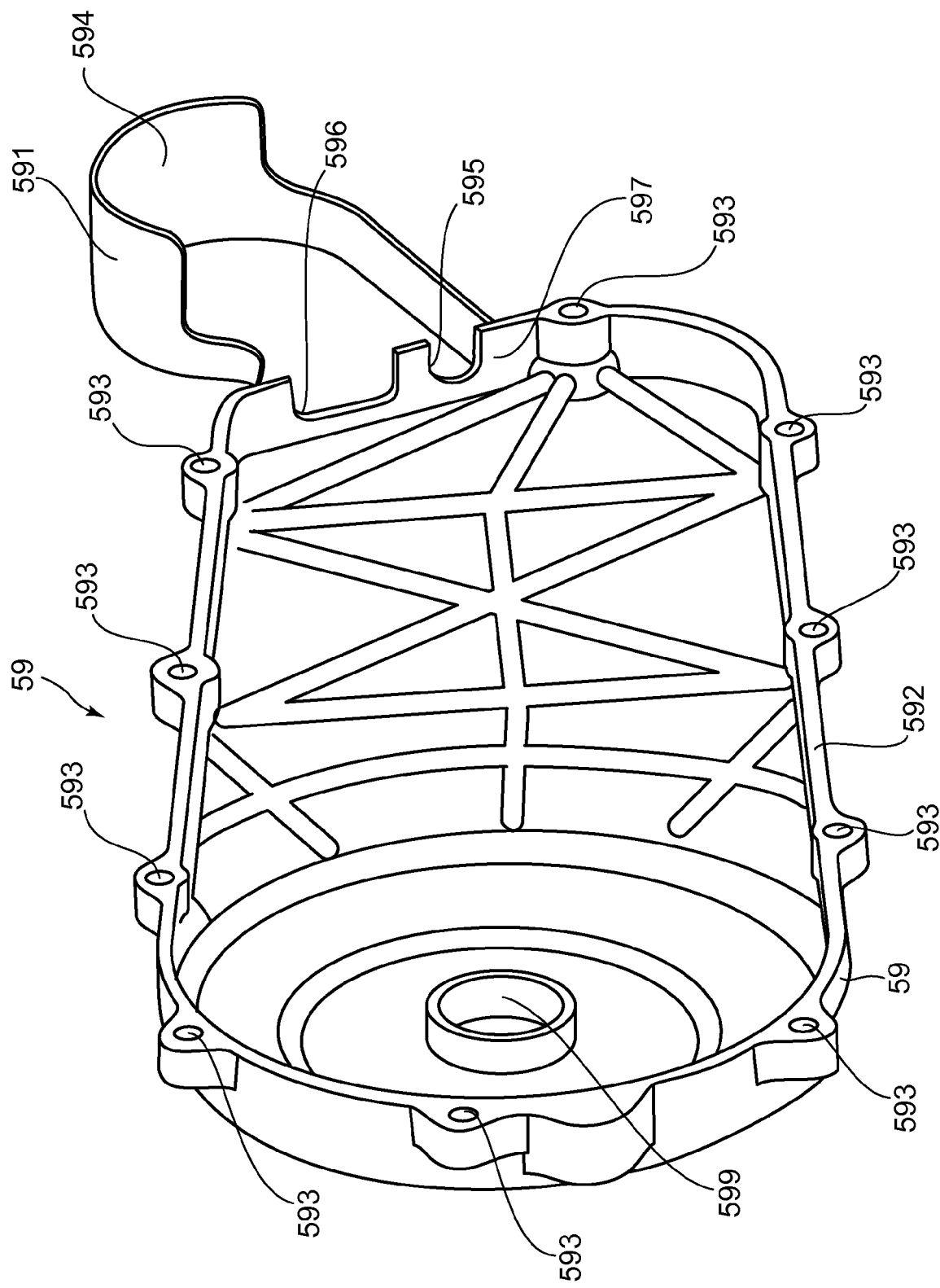
FIG. 10 is a perspective view of a case cover of the swing arm.

FIG. 10 is a perspective view of the case cover. The case cover 59 includes a peripheral wall 592 that matches the wall shape on the open side of the box-shaped case 58. The peripheral wall 592 includes a thick thickness portion having a plurality of holes 593 through which a plurality of bolts 90 can be passed. The extended cover portion 591 is extended from the peripheral wall 592 towards the front side of the vehicle body. The extended cover portion 591 includes a partially cylindrical front wall (guiding wall) 594 positioned closer to the front side of the vehicle body.

In the peripheral wall 592, a portion 597 for partitioning the extended cover portion 591 and the main body side of the case cover 59 is formed with the grommet grooves 595, 596 to which the grommets 66, 67 are fitted. The grommets 66, 67 are formed with a groove at the portion excluding the side facing the case 58 of the outer periphery, and the grommet grooves 595, 596 have the shape determined so as to match the groove of the peripheral edge of the grommet. The case cover 59 includes a bearing accommodation hole 599 for accommodating the bearing that supports one end of the rotation shaft of the motor 60.

Figure 11:
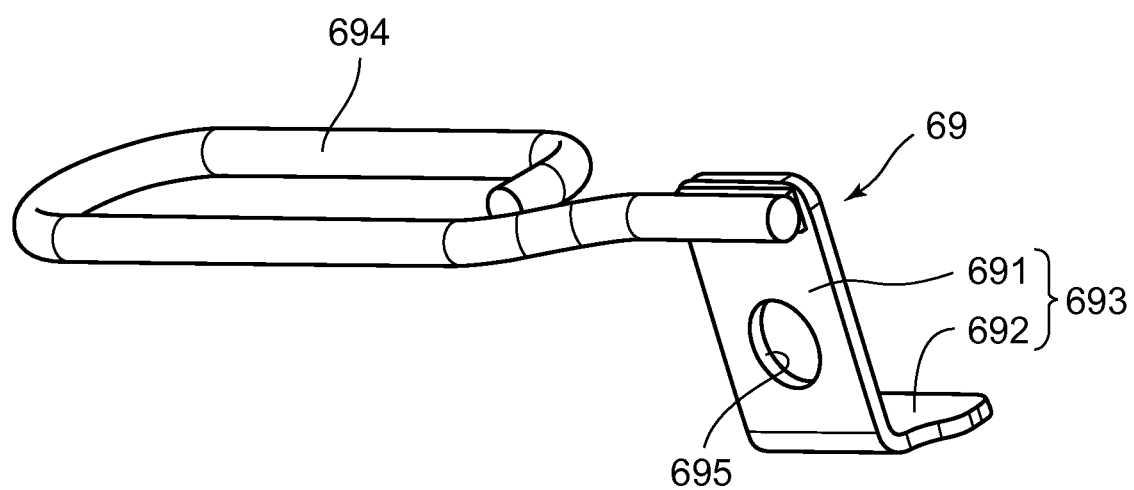
FIG. 11 is a perspective view of a stay for fixing a harness.

FIG. 11 is a perspective view of the stay for fixing the harness. The stay 69 includes a plate 693 having a portion 691 to be brought into contact with the surface along the open end of the upper wall 582 of the case 58, and a portion 692 bent from the portion 691 so as to face the inner surface of the upper wall 582 of the case 58, and an annular portion 694 welded to the plate 693. The annular portion 694 is formed by performing a bending work on the rod member so as to support the harness 64 to be passed through. The portion 691 of the plate 693 includes a hole 695 capable of passing the bolt 91 for fixing the stay 69.

The present invention has been described according to the embodiment, but the present invention is not limited to such embodiment. For instance, the charger of the main battery is not limited to being arranged separate from the electric vehicle 1, and may be arranged on the electric vehicle 1. The electric vehicle is not limited to a scooter type. The present invention can be applied to a drive device of an electric vehicle including a box-shaped swing arm pivotally supported by a vehicle body frame, and including a motor for driving a drive wheel accommodated in the swing arm and a harness connected to the motor and pulled out to the control device exterior to the swing arm.

REFERENCE SIGNS LIST

1 . . . electric vehicle
2 . . . vehicle body frame
7 . . . steering handle
25 . . . swing arm
26 . . . pivot shaft
43 . . . battery box
45 . . . battery
52 . . . control device
57 . . . pivot portion
58 . . . case
59 . . . case cover
60 . . . motor
61 . . . reducer
63 . . . sub-harness
64 . . . harness
66, 67 . . . grommet
69 . . . stay
70 . . . rear fender
71 . . . corrugate tube
100 . . . arm portion
591 . . . extended cover portion

The invention claimed is:

1. A drive device of an electric vehicle comprising a swing arm (25) including a pivot portion (57) pivotally supported by a pivot shaft (26) arranged in a vehicle body frame (2) of an electric vehicle (1), and an arm portion (100) extending from the pivot portion (57) towards a back side of a vehicle body to support a rear wheel (RW) at an end on the back side of the vehicle body and accommodating an electric motor (60) for driving the rear wheel (RW), wherein:

the arm portion (100) includes a box-shaped case (58) being integrally formed with the pivot portion (57) and having one side in a width direction of the vehicle body opened, and a case cover (59) for covering the open side of the case (58), a harness (64), connected to the electric motor (60), supported on the case (58) side at a first position proximate to the electric motor (60), and pulled out towards a front side of the vehicle body from the arm portion (100) through a harness supporting portion arranged at a front wall (597) of the case cover (59) at a second position on the pivot portion (57) side is arranged, and the case cover (59) includes an extended cover portion (591) having a guiding wall (594) for guiding a portion of the harness (64) pulled out from the arm portion (110) to a line along with the width direction of the vehicle body on the front side of the vehicle body.

2. The drive device of the electric vehicle according to claim 1, wherein the electric vehicle (1) includes a battery box (45) arranged on a front side of the pivot portion (57) and a control device (52) positioned at an upper part of the battery box (45), and the harness (64) guided by the extended cover portion (591) is passed between the battery box (45) and the pivot portion (57) and wired to the control device (52).

3. The drive device of the electric vehicle according to claim 2, wherein the harness (64) is passed between the battery box (45) and the pivot portion (57) to extend from one end to the other end in a vehicle width direction of the pivot portion (57), and wired to the control device (52).

4. The drive device of the electric vehicle according to claim 2, further comprising:

a rear fender (70) being extended to between the battery box (45) and the pivot portion (57), and including an opening (701) formed at a position facing the pivot portion (57); and the harness (64) is wired from the swing arm side (25) to the battery box (45) side through the opening (701).

5. The drive device of the electric vehicle according to claim 2, wherein the harness (64) includes three-phase power lines (62U, 62V, 62W) of the electric motor (60) and a sub-harness (63) including a plurality of signal lines, the three-phase power lines (62U, 62V, 62W) being pulled out from the arm portion (100) having an outer periphery covered by a corrugate tube (71) at a portion extending from the arm portion to the control device (52).

6. The drive device of the electric vehicle according to claim 1, wherein the harness (64) is passed through an annular portion (694) arranged in a stay (69) attached to the arm portion (100) at a portion wired to the extended cover portion (591).

7. The drive device of the electric vehicle according to claim 1, wherein the harness (64) is fixedly supported on the case (58) side using a clamp (65) at the first position, and is supported by the case cover (59) through an elastic member (66, 67) at the harness supporting portion of the second position.

8. The drive device of the electric vehicle according to claim 7, wherein the elastic member (66, 67) is a grommet which outer periphery engages a groove (595, 596) formed in the front wall (597) of the case cover (59), the harness (64) being passed through the grommet and supported by the case cover (59).

9. A drive device of an electric vehicle comprising a swing arm (25) including a pivot portion (57) pivotally supported by a pivot shaft (26) arranged in a vehicle body frame (2) of an electric vehicle (1), and an arm portion (100) extending from the pivot portion (57) towards a back side of a vehicle body to support a rear wheel (RW) at an end on the back side of the vehicle body and accommodating an electric motor (60) for driving the rear wheel (RW), wherein:

the arm portion (100) includes a box-shaped case (58) being integrally formed with the pivot portion (57) and having one side in a width direction of the vehicle body opened, and a case cover (59) for covering the open side of the case (58), a harness (64), connected to the electric motor (60), supported on the case (58) side at a first position proximate to the electric motor (60), and pulled out towards a front side of the vehicle body from the arm portion (100) through a harness supporting portion arranged at a front wall (597) of the case cover (59) at a second position on the pivot portion (57) side is arranged, the harness (64) is fixedly supported on the case (58) side using a clamp (65) at the first position, and is supported by the case cover (59) through an elastic member (66, 67) at the harness supporting portion of the second position, and the case cover (59) includes an extended cover portion (591) having a guiding wall (594) for guiding a portion of the harness (64) pulled out from the arm portion (110)to a line along with the width direction of the vehicle body on the front side of the vehicle body.

* * * * *